US011080992B2

(12) United States Patent
Johnson et al.

(10) Patent No.: US 11,080,992 B2
(45) Date of Patent: Aug. 3, 2021

(54) GAS DETECTOR CONNECTIVITY DONGLE

(71) Applicant: HONEYWELL INTERNATIONAL INC., Morris Plains, NJ (US)

(72) Inventors: Kirk William Johnson, Morris Plains, NJ (US); Jacob Thomas Spector, Morris Plains, NJ (US); Andrew Nilsson, Morris Plains, NJ (US); Dean Ford, Morris Plains, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/462,582

(22) PCT Filed: Nov. 30, 2016

(86) PCT No.: PCT/US2016/064138
§ 371 (c)(1),
(2) Date: May 21, 2019

(87) PCT Pub. No.: WO2018/101925
PCT Pub. Date: Jun. 7, 2018

(65) Prior Publication Data
US 2019/0295407 A1  Sep. 26, 2019

(51) Int. Cl.
*G08B 21/14* (2006.01)
*G08B 21/18* (2006.01)
(Continued)

(52) U.S. Cl.
CPC .............. *G08C 23/04* (2013.01); *G08B 21/14* (2013.01); *G08B 25/009* (2013.01); *H04B 10/40* (2013.01); *H04Q 9/00* (2013.01); *H04Q 2209/40* (2013.01)

(58) Field of Classification Search
None
See application file for complete search history.

(56) References Cited

U.S. PATENT DOCUMENTS

2012/0280818 A1* 11/2012 Johnson, Jr. .......... H04W 16/18
340/632
2014/0062693 A1  3/2014 Watts et al.
(Continued)

FOREIGN PATENT DOCUMENTS

CN   201852808 U   6/2011
CN   105046864 A   11/2015
(Continued)

OTHER PUBLICATIONS

Tiwari, et al., Using Mobile Phones with android OS for Measuring Hazardous Gas Concentrations Detected using Electronic Nose (E-Nose), 2014, Advanced Research in Electrical and Electronic Engineering, vol. 1, pp. 25-27 (Year: 2014).*
(Continued)

*Primary Examiner* — Curtis A Kuntz
*Assistant Examiner* — Jerold B Murphy
(74) *Attorney, Agent, or Firm* — Alston & Bird LLP (57) ABSTRACT

Embodiments relate generally to gas detector connectivity devices, for example a dongle, to allow for continuous communication of real-time data between a gas detector and a central station. Dongle embodiments typically comprise an IR transceiver, a processor, a wireless interface device, a power source, and a means of attachment. Such dongle embodiments, and their related methods of operation, may allow for retrofitting of legacy gas detectors to provide wireless capabilities.

20 Claims, 3 Drawing Sheets

(51) Int. Cl.
      *G08C 23/04*     (2006.01)
      *H04B 10/40*     (2013.01)
      *H04Q 9/00*      (2006.01)
      *G08B 25/00*     (2006.01)

(56) References Cited

U.S. PATENT DOCUMENTS

2015/0293511 A1* 10/2015 Laufer .................. G08B 7/06
                                                                                                                  700/275
2015/0310728 A1   10/2015 Calabrese et al.

FOREIGN PATENT DOCUMENTS

| GB | 2459501 A | 10/2009 |
|----|-----------|---------|
| KR | 2010-0815894 A | 7/2010 |
| KR | 2015-0017416 A | 2/2015 |

OTHER PUBLICATIONS

International Search Report and Written Opinion for Application No. PCT/2016/064138, dated Aug. 29, 2017, 11 pages.
Office Action for Canadian Patent Application No. 3,045,094 dated May 27 2020, 4 pages.
Annex to the communication dated Jun 25, 2020 for EP Application No. 16819748.
Communication from the Examining Division dated Jun 25, 2020 for EP Application No. 16819748.
Communication Pursuant to Rules 161(1) and 162 for European Patent Application No. 16819748.1 dated Jul. 9, 2019, 3 pages.
Intention to Grant issued in European Application No. 16819748.1 dated Feb. 10, 2021, 35 pages.
Office Action issued in Canadian Application No. 3,045,094 dated Apr. 15, 2021, 3 pages.

\* cited by examiner

GAS DETECTOR CONNECTIVITY DONGLE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD

Embodiments generally relate to gas detector connectivity devices to allow for retrofitting of legacy (e.g. pre-existing models of) gas detectors to provide communication of data between a gas detector and an external device, such as a central station, for example via wireless connection.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The embodiments of this disclosure typically relate to gas detector connectivity devices for use with gas detector devices, for example, typically to retrofit legacy portable gas detector devices, to allow for (continuous) communication of data gathered by the gas detector, for example to a central station. In this disclosure, the term legacy is used to describe gas detectors without connectivity which have been superseded by newer, more technologically advanced gas detectors (e.g. with built-in connectivity, for example due to wireless capabilities) but are hard/expensive to replace due to such wide usage. Conventionally, within industry, portable gas detector devices may be worn by a user to allow for detection of gas exposure (and to provide a warning whenever an exposure limit has been exceeded). Typically, the user would wear the portable gas detector device during the work shift, and once the work shift is complete, the user might go to a nearby docking station (or other such plug-in device) to transmit data that the gas detector may have gathered during the work shift. This would typically lead to delayed access to the gas detector data by the central station and delayed compilation of data by the central station from several gas detector devices at the end of a work shift (and/or whenever the user chooses to go to the docking station to transmit the data). Due to the delayed/non-continuous gathering of data from multiple gas detectors (e.g. legacy gas detectors) by the central station, the central station is not able to use the gathered data in real-time (so for example, the user entering an area with greater than the recommended gas exposure threshold may not be warned until after already having entered the hazard zone, while real-time compilation of data from multiple gas detectors may allow for early warning). Persons of skill will understand this and many other uses for types of real-time data that connectivity enables. Additionally, gas detectors (for example, legacy gas detectors) may not be able to receive communication (for example, from the supervisor and/or manager) via the central station (for example, from a remote or offsite location). Thus, disclosed embodiments may allow for real-time communication between legacy gas detector devices (in other words, gas detector devices which do not independently have the ability to communicate real-time data to a central station, for example via wireless connection) and the central station (which may be two-way communication in some embodiments, although other embodiments may allow only one-way communication from the gas detector to the central station). Thus, embodiments of the present disclosure may address one or more of such issues in an attempt to retrofit legacy gas detector devices to allow for continuous/constant communication (for example, to allow shared data to be pooled for a common purpose) with a central station via a wireless connection.

Disclosed embodiments relate to a gas detector connectivity device, hereinafter referred to as a dongle, for a gas detector device (which is separate and apart from the gas detector itself, e.g. a stand-alone, self-contained device). In this disclosure, a dongle may be a device which is able to connect with (e.g. attach to) and allow pass-through of information from the gas detector to the outside world (e.g. central station). The dongle might, for example, be used with legacy gas detectors to allow for continuous/constant communication (for example, overcoming the lack of built-in wireless connection in the legacy gas detectors) with other gas detectors and/or the central station. Typically, such communication via the dongle could be wireless communication. In this disclosure, continuous/constant communication may, for example, mean regular, periodic communication. For example, communication may take place a plurality of times during a work shift (e.g. every 10 minutes, 5 minutes, 2 minutes, 1 minute, 30 seconds, 10 seconds, etc.). In some embodiments, communication might occur when there is a significant event, such as a substantial change in the gas measurement and/or an alarm limit is reached. Additionally, the dongle might, for example, be used with gas detector devices which are portable, meaning they are configured to be worn by the user. Due to strict regulations within the gas detector industry, gas detectors may not be physically (for example, electrically) altered (e.g. not wired or otherwise directly electrically connected to) and/or the gas detector casing may not be opened. Thus, the dongle would generally be configured for a non-physical communication connection to the gas detector (e.g. it may be physically attached to the outside casing of the gas detector, but would only interact communicatively with the gas detector via receipt of signals from the IR transceiver of the gas detector—attachment of the dongle would not include electrical connection or in any way require opening of the gas detector casing/housing).

Typically, the dongle would include a housing which would enclose a power source, a (wireless) interface device, an IR transceiver (which would typically be able to receive and transmit IR signals, but in some embodiments might merely be an infrared (IR) receiver operable only to receive IR signals), and a processor. The dongle would typically have its own independent power source due to the fact that gas detectors may not allow direct electrical connection (so that the dongle would be electrically self-contained). In some embodiments, the power source may comprise a long-lasting battery or a rechargeable battery. In other embodiments, the power source may comprise a disposable battery. The interface device would typically be a means for the dongle to wirelessly communicate (for example, with a central station). So, for example, the interface device might be a wireless transceiver (able to transmit and receive), or in other embodiments, merely a wireless transmitter (e.g. able to send gas data to the central station). In some embodiments, the interface device may also allow for a wired connection means by which to communicate and/or recharge the dongle and/or perform system/firmware upgrades. Typically, the interface device may be located furthest away from the gas detector when the dongle is attached (e.g. furthest away from the IR transceiver of the dongle).

The IR transceiver of the dongle may typically be configured to interact with the IR transceiver of the gas detector. Typically, the IR transceiver may be oriented outward away from the housing of the dongle (e.g. so that it might face the IR transceiver of the gas detector when the dongle is attached in place). The IR transceiver would typically receive IR signals from the IR transceiver of the gas detector and/or it would typically transmit IR signals to the IR transceiver of the gas detector. In some embodiments, the IR transceiver of the dongle would face towards the IR transceiver of the gas detector when configured (e.g. the dongle is attached to the gas detector) to interact with each other. The processor of the dongle would generally be configured to translate between the IR transceiver of the dongle and the interface device. In other words, the processor may convert the received IR signal from the gas detector to an output signal operable/configured for transmission by the wireless interface device. Furthermore, the processor would typically transmit the output signal to the interface device for transmission (for example, to a central station, a handheld/portable device (such as a smart phone with Wi-Fi), and/or other gas detectors). In some embodiments, the processor may additionally operate by receiving a signal from the interface device, converting that interface device signal to an IR signal, and transmitting the IR signal to the IR transceiver of the dongle for transmission to the IR transceiver of the gas detector. In other words, the processor may convert an input signal from the wireless interface device to an IR signal for the IR transceiver, and transmit the IR signal to the IR transceiver for transmission. In this manner, the dongle may be configured to (continuously) communicate between the gas detector (onto which the dongle is attached, e.g. with the IR transceiver of the dongle facing the IR transceiver of the gas detector) and the central station. The housing would typically further comprise a means of attachment (to the corresponding gas detector). The means of attachment would typically allow the dongle to fully cover the IR transceiver of the gas detector when the dongle is attached. However, in some embodiments, the dongle may not fully cover the IR transceiver of the gas detector (but would at least have its IR transceiver directed towards the IR transceiver of the gas detector). This may allow the gas detector to perform tasks directly through its IR transceiver (e.g. to use its IR transceiver for its original purpose), as well as through the dongle.

The dongle would typically serve as an infrastructure update for legacy gas detector devices, so they may perform as gas detector devices comprising a wireless means of communication. In other words, the dongle would typically serve as an intermediary device, providing wireless capabilities to gas detectors which inherently lack them. In some embodiments, the dongle may be permanently attached to the gas detector, and in other embodiments, the dongle may be removably attached to the gas detector. In the case of permanent attachment, the dongle may be attached to the gas detector via screws, strong adhesive, and/or a one-way means of snapping the dongle into a slot. In this disclosure, "permanently" means that it may be possible to use force to pull the dongle off the gas detector, but this method of removal may effectively damage the gas detector device and/or the dongle and/or be difficult to accomplish (e.g. requiring tools). In this case, "permanently" means that it would be very inconvenient to remove the dongle from the gas detector (e.g. not easily done). In the case of removable attachment, there may be multiple possible means of attachment of the dongle to the corresponding gas detector. In some embodiments, the dongle may be (removably) clipped or snapped onto the gas detector, or the dongle may comprise one or more elements for inserting the dongle into a detachable boot on the gas detector. In other embodiments, the gas detector may comprise a slot to allow for (removable) insertion of the dongle. Persons of skill should appreciate the removable and permanent means of attachment which would function effectively to allow the user to attach the dongle to the gas detector (e.g. so they may be carried and/or used as a single (unitary) device and/or so that the IR transceivers are oriented towards one another for communication interaction). In the described embodiments above, during attachment, the IR transceiver of the gas detector would typically interface with (e.g. face towards) the IR transceiver of the dongle to allow for communication via IR signals.

In use, the dongle may typically be operable to wirelessly communicate (directly) with the central station. In some embodiments, however, the dongle may be operable to wirelessly communicate to a handheld/portable device first, and then the handheld/portable device would be configured to communicate with the central station (e.g. the dongle might be configured for indirect communication with the central station). Additionally, in some embodiments, the dongle may be operable to communicate to the handheld/portable device and the central station at the same time (e.g. data (either the same data or different data) being sent to different locations at the same time). So, for example, the user may attach the dongle to the gas detector with the IR transceiver of the dongle interfacing with the IR transceiver of the gas detector. Then, during use, the gas detector may transmit an IR transmission signal to the IR transceiver of the dongle (e.g. indicative of gas detector data, such as gas concentration or exposure readings). The IR transceiver of the dongle may receive the IR transmission signal and transmit the IR transmission signal to the processor (e.g. convert the IR signal to a corresponding electrical signal indicative of the gas detector data and transmit to the processor). The processor may translate the IR transmission signal (e.g. corresponding electrical signal) into a wireless (electrical) signal and transmit the wireless (electrical) signal to the wireless interface device. Then, the wireless interface device typically would send the wireless signal to a handheld/portable device and/or a central station (e.g. convert the wireless electrical signal to an actual wireless signal, such as Bluetooth, Wi-Fi, etc.). In some embodiments, the wireless interface device may be operable to interact with other (similar) gas detectors (e.g. either with built-in connectivity or their own dongle).

If the wireless interface device is configured to interact with a central station, the wireless interface device would typically transmit a wireless signal to the central station. In some embodiments, a central station may comprise a central (remote or offsite) computer. In some embodiments, the central station may comprise distributed computing and/or a cloud computing system. If the wireless interface device is configured to interact with a handheld/portable device, the wireless interface device may typically transmit a wireless signal to the handheld/portable device, which may then transmit a wireless signal to the central station. In some embodiments, the wireless means of communication may comprise Bluetooth (BLE), Wi-Fi, Li-Fi, LTE, etc. Additionally, in some embodiments, the dongle may comprise a near-field communication (NFC) antenna to allow transmission of signals between the dongle and the handheld/portable device.

While the gas detector may communicate one-way with the central station in some embodiments, the central station might also communicate with the gas detector in other embodiments. In other words, two-way communication may occur between the central station and the gas detector via the dongle. In the case of the central station communicating with the gas detector, the central station and/or the handheld/portable device may transmit an input (wireless) signal to the wireless interface device of the dongle. The wireless interface device may transmit the input (wireless) signal to the processor (e.g. convert the input wireless signal to a corresponding input electrical signal and transmit to the processor). The processor may translate/convert the input (wireless/electrical) signal to an IR output signal. Then the processor may transmit the IR output signal to the IR transceiver of the dongle. The IR transceiver of the dongle would typically transmit the IR output signal to the IR transceiver of the gas detector (e.g. convert the electrical IR output signal from the processor into an actual IR signal indicative of the input signal received). In this method of back and forth communication, gas data may be compiled, processed, and stored by the central station. In some embodiments, the central station may perform an analysis and transmit data back to the gas detector. In some embodiments, a supervisor/manager may transmit information via the central station to the user (e.g. alerts or signals which may warn the user of a potential hazard). Thus, if one or more dongles are used with corresponding gas detectors, the central station may have access to real-time data, and, in the case of receiving data from a plurality of gas detectors, the central station may have real-time data compilation.

In some embodiments, the dongle may also comprise a means to track the user's location. For example, the user's location may be tracked using global positioning systems (GPS) and/or Wi-Fi positioning systems (WPS) (e.g. the means to track location may be a GPS device or via Wi-Fi signal/triangulation). Persons of skill should appreciate additional means of tracking the user's location which would function effectively as part of the dongle. The dongle may link the real-time data with the location data. In other words, the wireless location signals would typically correspond with the gas data gathered by the gas detector at that location. This may allow the dongle to transmit gas data with corresponding location. This may further allow the central station to compile a real-time map of gas data (e.g. gas levels). This would typically improve the manager and/or supervisor's ability to determine if, for example, a gas leak is occurring in a certain area and/or to provide early warning to gas detector users based on compiled data from several gas detectors.

In other embodiments, the dongle may be configured to communicate with a handheld/portable device. The handheld/portable device would typically be configured to track the user's location via GPS, WPS, or other means of tracking location. In this case, the handheld/portable device would typically link the wireless location signals with the wireless transmission signals received from the dongle and transmit the data to the central station. In some embodiments, the central station may be operable to send signals and notifications to the user's handheld/portable device and/or the dongle (and thereby to the gas detector). While persons of skill should understand the disclosed embodiments based on the above disclosure, the following figures may provide specific examples that may further clarify the disclosure.

Figure 1:
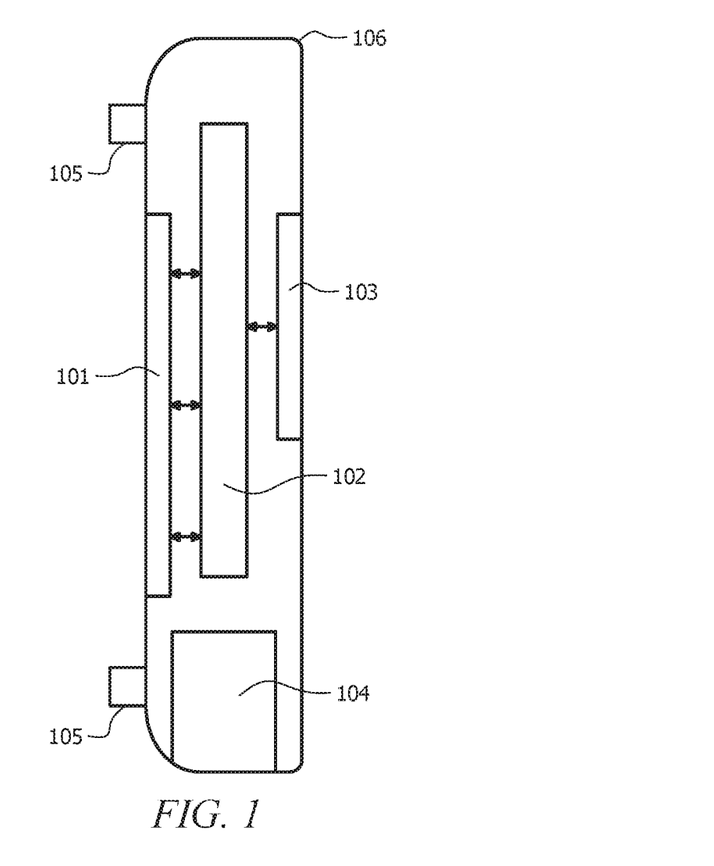
FIG. 1 illustrates a cross-sectional view of an exemplary embodiment of the dongle comprising an IR transceiver, a processor, an interface device, a power source, a means of attachment, and a housing.

Turning now to the drawings, FIG. 1 illustrates a cross-sectional view of an exemplary embodiment of the dongle 100 comprising an IR transceiver 101, a processor 102, an interface device 103, a power source 104, a means of attachment 105, and a housing 106. The housing 106 of the dongle 100 typically encloses the IR transceiver 101, the interface device 103, the processor 102, and/or the power source 104, while the means of attachment 105 is located outside the housing 106 (e.g. a portion of the exterior of the housing 106). The exemplary dongle 100 of FIG. 1 has its own independent power source 104 (e.g. separate from that of the gas detector due to the fact that gas detectors may not allow direct electrical connection). In the embodiment of FIG. 1, the power source 104 may comprise a disposable battery, a long-lasting battery, and/or a rechargeable battery. The interface device 103 of FIG. 1 typically serves as a means for the dongle 100 to wirelessly communicate with the central station and/or the portable/handheld device (with wireless communication capabilities, typically with a different mode of communication than the dongle 100). In some embodiments, the interface device 103 may allow for a wired connection means by which to communicate with the handheld/portable device, recharge the dongle 100, and/or perform system/firmware upgrades. As shown in the embodiment of FIG. 1, the interface device 103 may be located furthest away (e.g. outermost) from the gas detector when the dongle 100 is attached. The IR transceiver 101 of the dongle 100 may typically be configured to interact with the IR transceiver 101 of the gas detector. In the exemplary embodiment of FIG. 1, the IR transceiver 101 is oriented outward (e.g. facing out) away from the housing 106 of the dongle 100. The IR transceiver 101 would typically receive IR signals from the IR transceiver of the gas detector and/or it would typically transmit IR signals to the IR transceiver of the gas detector. In the exemplary embodiment of FIG. 1, the IR transceiver 101 of the dongle 100 would face towards the IR transceiver of the gas detector when configured (e.g. attached) to interact with each other. The processor 102 would generally be configured to translate between the IR transceiver 101 of the dongle 100 and the interface device 103 (e.g. convert IR signals to wireless signals, or vice versa). Thus, in the embodiment of FIG. 1, the processor 102 may be located between the (wireless) interface device 103 and the IR transceiver 101 of the dongle 100. In this manner, the dongle 100 may be configured to (continuously) communicate between the gas detector and the central station (and/or handheld/portable device). Lastly, the means of attachment 105 of the exemplary embodiment of FIG. 1 is configured to allow the dongle 100 to fully cover the IR transceiver of the gas detector when the dongle 100 is attached. However, in some embodiments, the dongle 100 may not fully cover the IR transceiver of the gas detector (so long as the dongle 100 is still configured/oriented to receive and/or transmit IR signals with the gas detector). This may allow the gas detector to perform some tasks directly through its IR transceiver (e.g. using the IR transceiver of the gas detector as originally intended) as well as through the dongle 100 (e.g. to provide wireless/real-time/continuous connectivity to legacy gas detectors via retrofit). Optionally, in some embodiments, the dongle 100 may comprise a means to track the user's location 108. The user's location may be tracked using GPS or WPS. This would typically allow the dongle 100 to link the real-time data received by the gas detector via IR signal to the corresponding location data. In other embodiments, the dongle 100 may not comprise the means to track the user's location 108. This may be because, in some embodiments, the dongle 100 may be configured to interact with a portable/handheld device with a pre-existing means to track the user's location 108. In this case, the portable/handheld device may transmit the location data to the central station and the central station may link the real-time (gas) data with the corresponding location data.

Figure 2:
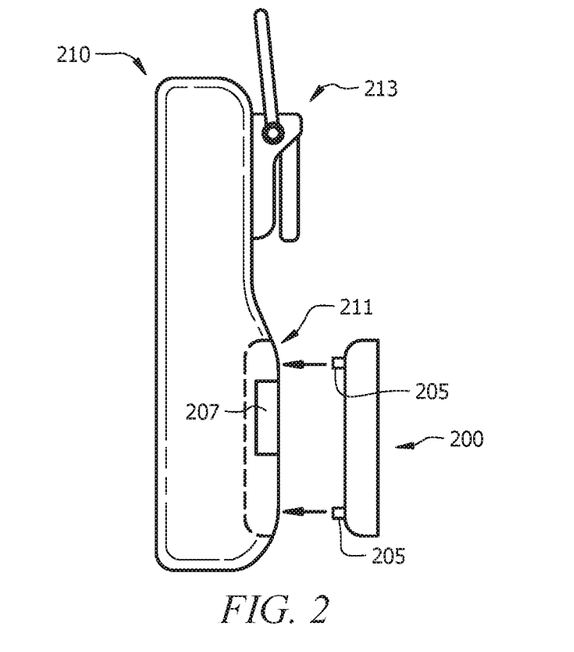
FIG. 2 illustrates a side view of an exemplary embodiment of a gas detector device (for example, similar to that of FIG. 1) configured for use with a dongle.

FIG. 2 illustrates a side view of an exemplary embodiment of a gas detector device 210 configured for use with a dongle 200. In the embodiment of FIG. 2, the gas detector device 210 is a portable gas detector device 210 comprising a belt buckle 213 and an IR transceiver 211. The IR transceiver 211 of the gas detector device 210 may be configured (e.g. by download of firmware/software) to interface/interact with the IR transceiver of the dongle 200. Additionally, the gas detector device 210 may comprise a point of attachment 207 as shown in the embodiment of FIG. 2. The point of attachment 207 may be operable to interact with the dongle 200. In the embodiment of FIG. 2, the dongle 200 comprises a means of attachment 205 (operable to allow attachment of the dongle 200 onto the corresponding gas detector device 210, for example at the point of attachment 207, so that the IR transceiver of the dongle 200 is facing (e.g. directed toward) the IR transceiver 211 of the gas detector device 210 to allow interaction). In FIG. 2, the means of attachment 205 comprises two elements (e.g. located on the top part and the bottom part of the side of the dongle 200 configured to interface with the IR transceiver 211 of the gas detector device 210). The elements may typically be operable to clip/snap the dongle 200 onto the portable/wearable gas detector device 210 (with the dongle 200 often oriented with the IR transceiver facing the IR transceiver 211 of the gas detector device 210). In the embodiment of FIG. 2, the dongle 200 clips/snaps onto the portable/wearable gas detector device 210 so that the dongle 200 fits snugly within the slot of the gas detector device 210. In some embodiments, the dongle 200 may vary in shape and/or size depending on the available slot (or lack of slot) in the gas detector device 210. Additionally, in other embodiments, there may be alternative methods of attaching the dongle 200 to the gas detector device 210. For example, in some embodiments, the dongle 200 may be inserted into a detachable boot on the portable/wearable gas detector device 210. In some embodiments, the dongle 200 may be snapped into a slot on or within the portable/wearable gas detector device 210. Typically, the means of attachment 205 in FIG. 2 is removable. Persons of skill should appreciate the several different means of attaching the dongle 200 to the gas detector device 210 while ensuring the IR transceiver of the dongle 200 interfaces with the IR transceiver 211 of the gas detector device 210.

Figure 3:
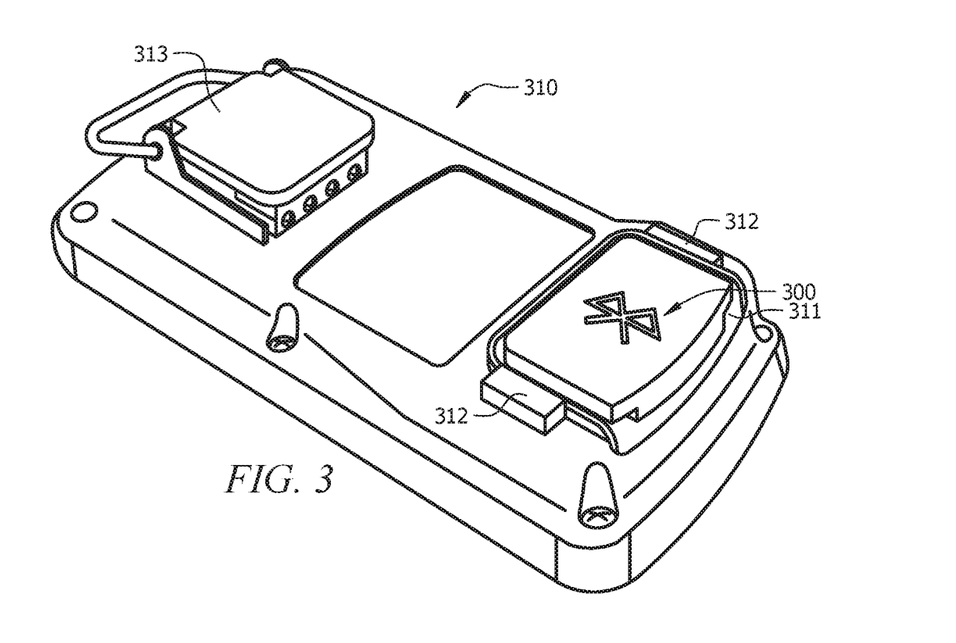
FIG. 3 illustrates a top perspective view of the back/rear of the exemplary embodiment of a gas detector device shown in FIG. 2, with the dongle attached to the IR transceiver of the gas detector.

FIG. 3 illustrates a top view of the back of the exemplary embodiment of the gas detector device 310 shown in FIG. 2 with the corresponding dongle 300 attached. The exemplary embodiment of the gas detector shown in FIG. 3 comprises a belt clip 313 similar to the belt clip shown in FIG. 2. Additionally, the exemplary embodiment of the gas detector shown in FIG. 3 comprises a dongle 300 that may be removably attached to the IR transceiver 311 of the gas detector device 310. In this exemplary embodiment, the dongle 300 is configured to cover the entire IR transceiver 311. However, in some embodiments, the dongle 300 may not cover the entire IR transceiver 311 (for example, with a portion of the IR transceiver 311 of the gas detector device 310 being uncovered/unconcealed, the IR transceiver 311 of the gas detector device 310 may be operable to directly communicate with other devices as well as communicate with the dongle 300). Additionally, as shown in the embodiment of FIG. 3, the wireless interface device may be located within and closest to the outermost area of the housing of the dongle 300. In the embodiment of FIG. 3, the wireless interface device is operable to communicate via Bluetooth with other devices such as the central station and/or the handheld/portable device (or for example, with the central station via the handheld/portable device). In other embodiments, the wireless interface device may be operable to communicate via another wireless means, for example Wi-Fi, Li-Fi, LTE, etc. Also included in the embodiment of the gas detector device 310 shown in FIG. 3 are two internal clearance zones 312. The internal clearance zones 312 may be optional. In some embodiments, the internal clearance zones 312 may function as IR transceivers. In other embodiments, the internal clearance zones 312 may be operable to allow the gas detector device 310 to mount onto the docking station.

Figure 4:
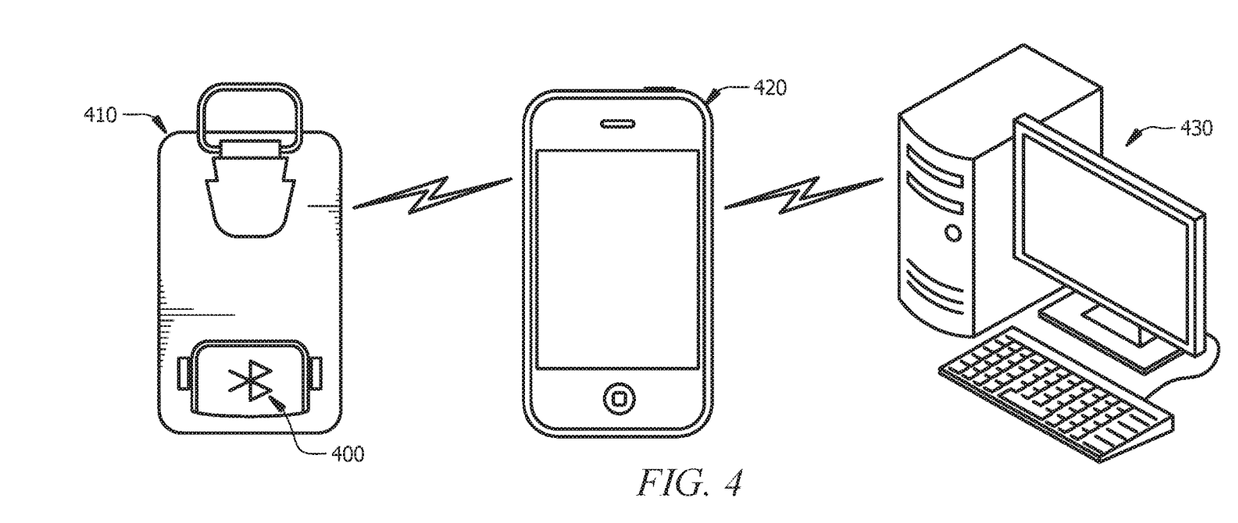
FIG. 4 illustrates a method of transmitting data to a central station from the dongle via a handheld/portable device according to an embodiment of the disclosure.

FIG. 4 illustrates a method of transmitting data to a central station 430 from the dongle 400 via a handheld/portable device 420. The exemplary embodiment of the gas detector 410 in FIG. 4 comprises a dongle 400 pre-attached to the portable/wearable gas detector 410. The IR transceiver of the gas detector 410 is configured to interact with (e.g. face towards) the IR transceiver of the dongle 400. During use, the portable/wearable gas detector 410 may be operable to transmit/send an IR transmission signal to the IR transceiver of the dongle 400. The IR transceiver of the dongle 400 may then receive the IR transmission signal and transmit/send it to the processor of the dongle 400. The processor of the dongle 400 may then translate the IR transmission signal to a wireless signal ready for transmission to the wireless interface device. In the embodiment of FIG. 4, the wireless interface device is configured to interact with a handheld/portable device 420. The handheld/portable device 420 may receive the input (wireless) signal and transmit the input (wireless) signal to the central station 430. The central station 430 may comprise a (smart) phone, a central (remote/offsite) computer for distributed computing, and/or a cloud computing system. Additionally, the central station 430 may be configured to receive wireless signals from a plurality of dongles 400 and/or gas detectors 410 with wireless capabilities. Generally, the central station 430 may compile, process, and store various wireless signals, for example for further analysis by a software and/or the supervisor/manager. The central station 430 may similarly communicate back to the gas detector 410 through the handheld/portable device 420 and the dongle 400. In this case, the central station 430 may transmit wireless signals to the handheld/portable device 420 which may receive the wireless signals and transmit the wireless signals to the dongle 400. The wireless interface device of the dongle 400 may transmit the wireless signals to the processor. The processor may translate/convert the wireless signals to IR signals to transmit to the IR transceiver of the dongle 400. The IR transceiver of the dongle 400 (which may interface the IR transceiver of the gas detector 410 when attached) may transmit the IR signals to the gas detector 410. In this manner, two-way communication between the gas detector 410 and the central station 430 may occur via the dongle 400 and, optionally, the handheld/portable device 420.

Figure 5:
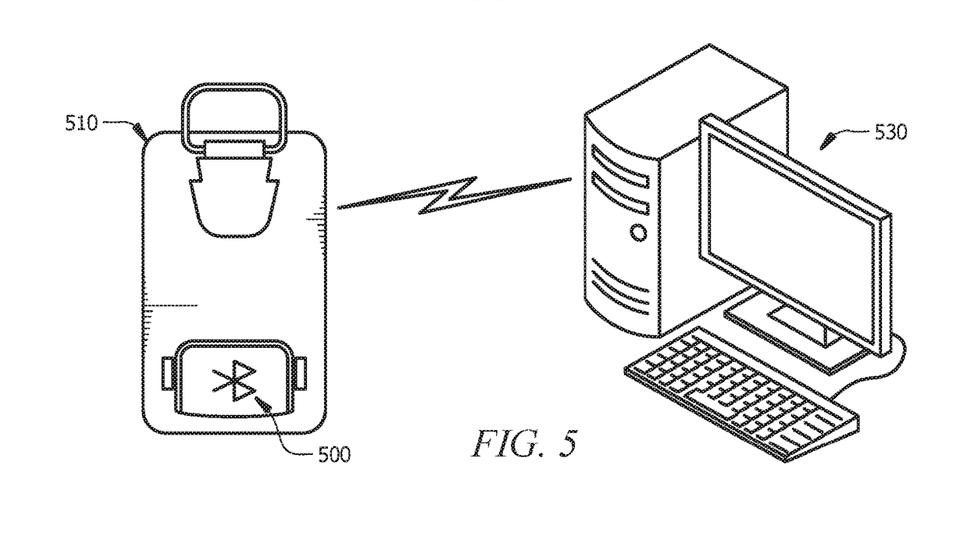
FIG. 5 illustrates a method of transmitting data directly to a central station via the dongle according to an embodiment of the disclosure.

FIG. 5 illustrates a method of transmitting data to a central station 530 via the dongle 500 according to an embodiment of the disclosure. The exemplary embodiment of the gas detector 510 in FIG. 5 comprises a dongle 500 pre-attached to the portable/wearable gas detector 510. The IR transceiver of the portable/wearable gas detector 510 may be oriented to interface with the IR transceiver of the dongle 500. In this manner, the IR transceiver of the gas detector 510 may send an IR signal to the IR transceiver of the dongle 500. The dongle 500 may then receive the IR transmission signal and transmit/send it to the processor of the dongle 500. The processor of the dongle 500 may then translate the IR transmission signal to a wireless signal ready for transmission to the central station 530. In some embodiments, the central station 530 may be configured to communicate back to the gas detector 510 via the dongle 500. In this case, the central station 530 may transmit a wireless signal to the wireless interface device of the dongle 500. The wireless interface device may transmit the wireless signal to the processor so that the processor can translate the wireless signal into an IR signal. The processor may then transmit the IR signal to the IR transceiver of the dongle 500. The IR transceiver may then communicate with the IR transceiver of the gas detector 510 via transmission of IR signals. As discussed in reference to FIG. 4, the central station 530 may comprise a laptop or tablet computer, a (smart) phone, a central (remote or offsite) computer, a distributed computing system, and/or a cloud computing system. Thus, in some embodiments, the central station 530 may be configured to receive real-time (e.g. continuous) gas data from the gas detector via the dongle and/or to provide real-time feedback (wirelessly) to the gas detector 510 and/or the portable/handheld device discussed in reference to FIG. 4.

Having described device, method, and system embodiments above, especially with regard to the figures, various additional embodiments can include, but are not limited to the following:

In a first embodiment, a dongle may comprise: a housing, an infrared (IR) transceiver (which in some embodiments could be just an IR receiver), a processor, a power source, and a wireless interface device, wherein: the IR transceiver of the dongle may be configured to interact with (e.g. receive from and/or transmit IR signals to) (e.g. face towards each other when attached to) an IR transceiver of a portable/wearable gas detector; the processor may be configured to translate (e.g. convert the received IR signal from the gas detector to an output signal operable/configured for transmission by the wireless interface device and transmit to the wireless interface device for transmission and/or convert an input signal from the wireless interface device to an IR signal for the IR transceiver and transmit the IR signal to the IR transceiver for transmission) between the IR transceiver of the dongle and the wireless interface device; and the housing may comprise a (removable) means of attachment to the portable/wearable gas detector. A second embodiment can include the dongle of the first embodiment, wherein the dongle may be configured to (communicate with the portable/wearable gas detector and) send (and receive) real-time (gas) data via a central station using wireless connection A third embodiment can include the dongle of the first or second embodiments, wherein the housing may enclose the IR transceiver of the dongle, the processor, the power source, and the wireless interface device. A fourth embodiment can include the dongle of the first to third embodiments, wherein the wireless interface device may comprise one of the following: Wi-Fi, Li-Fi, LTE, Bluetooth (BLE), and combinations thereof. A fifth embodiment can include the dongle of the first to fourth embodiments, wherein the wireless interface device may comprise an external port/plug configured to interact (e.g. via a wire (such as USB/FireWire)) with an external wireless device. A sixth embodiment can include the dongle of the first to fifth embodiments, wherein the processor may be configured to convert the received IR signal from the gas detector to an output signal operable/configured for transmission by the wireless interface device and transmit to the wireless interface device for transmission. A seventh embodiment can include the dongle of the first to sixth embodiments, wherein the processor may be configured to convert an input signal from the wireless interface device to an IR signal for the IR transceiver and transmit the IR signal to the IR transceiver for transmission. An eighth embodiment can include the dongle of the first to seventh embodiments, wherein the IR transceiver of the dongle may be oriented outward from the housing (e.g. towards the IR transceiver of the portable/wearable gas detector). A ninth embodiment can include the dongle of the first to eighth embodiments, wherein the power source may be configured to interact (e.g. supply power) with the IR transceiver of the dongle, the wireless interface device, and the processor. A tenth embodiment can include the dongle of the first to ninth embodiments, wherein the power source (of the dongle) may be separate from the power source within the portable/wearable gas detector. An eleventh embodiment can include the dongle of the first to tenth embodiments, wherein the dongle may be separate and self-contained (e.g. not wired or otherwise directly electrically connected to the portable/wearable gas detector, such that the only interaction between the dongle and the gas detector is via IR transmission, for example between the IR transceiver of the dongle and the IR transceiver of the gas detector). A twelfth embodiment can include the dongle of the first to eleventh embodiments, wherein the dongle may continuously communicate real-time (gas) data to the central station. A thirteenth embodiment can include the dongle of the first to twelfth embodiments, wherein continuous communication may comprise regular, periodic communication (for example, plurality of times during a work shift, for example, every 10 minutes, 5 minutes, 2 minutes, 1 minute, 30 seconds, 10 seconds, etc.). A fourteenth embodiment can include the dongle of the first to thirteenth embodiments, wherein continuous communication may comprise open/constant communication/contact. A fifteenth embodiment can include the dongle of the first to fourteenth embodiments, wherein continuous communication may comprise contact/communication whenever (any time) there is information to update (e.g. a change in (gas) data and/or a change in received data from the central station). A sixteenth embodiment can include the dongle of the first to fifteenth embodiments, wherein the central station may comprise one of the following: a handheld/portable device (such as a (smart) phone), a central (remote or offsite) computer, a distributed computing system, a cloud computing system (to enable cloud computing), and combinations thereof. A seventeenth embodiment can include the dongle of the first to sixteenth embodiments, wherein the dongle may be configured to interact with a user's handheld/portable device (such as a smart phone or laptop or tablet computer) via a wireless signal (Bluetooth, WiFi, LTE, etc). An eighteenth embodiment can include the dongle of the first to seventeenth embodiments, wherein the dongle communicates with the handheld/portable device using a first wireless communication mode (for example, Bluetooth or NFC), while the handheld/portable device is also operable/configured for wireless communication via a second wireless communication mode (for example, Wi-Fi) (e.g. the handheld/portable device is configured/operable to use both the first and second communication modes). A nineteenth embodiment can include the dongle of the first to eighteenth embodiments, wherein the handheld/portable device may be configured/operable to interact (e.g. transmit and/or receive a signal) with the central computer, a distributed computing system, a cloud computing system, and/or a wireless system. A twentieth embodiment can include the dongle of the first to nineteenth embodiments, wherein the dongle may further comprise a means to track the user's location. A twenty-first embodiment can include the dongle of the first to twentieth embodiments, wherein the means to track the user's location may comprise using global positioning systems (GPS). A twenty-second embodiment can include the dongle of the first to twenty-first embodiments, wherein the means to track the user's location may comprise using Wi-Fi positioning system (WPS). A twenty-third embodiment can include the dongle of the first to twenty-second embodiments, wherein the processor links the user's location with gas data for transmission (e.g. via the interface device). A twenty-fourth embodiment can include the dongle of the first to twenty-third embodiments, wherein the means to track the user's location is provided by the handheld/portable device, which links the gas data with the location data for transmission to the central station. A twenty-fifth embodiment can include the dongle of the first to twenty-fourth embodiments, wherein the dongle's means of attachment may comprise one or more elements for clipping/snapping the dongle onto the portable/wearable gas detector. A twenty-sixth embodiment can include the dongle of the first to twenty-fifth embodiments, wherein the dongle's means of attachment may comprise one or more elements for inserting the dongle into a detachable boot on the portable/wearable gas detector. A twenty-seventh embodiment can include the dongle of the first to twenty-sixth embodiments, wherein the dongle's means of attachment may comprise snapping the dongle into a slot on the portable/wearable gas detector, and wherein in such snapped-in configurations, the IR transceiver of the dongle may interface with (e.g. faces towards) the IR transceiver of the portable/wearable gas detector when the dongle is attached to the gas detector (e.g. wherein the means of attachment is configured to position the IR transceiver of the dongle so as to interact with (e.g. face towards) the IR transceiver of the gas detector (so they will be operable to communicate via IR signals)). A twenty-eighth embodiment can include the dongle of the first to twenty-seventh embodiments, wherein the dongle may be configured to be attached (typically removably) to the portable/wearable gas detector to retrofit the (legacy/older model without wireless communication capabilities) portable/wearable gas detector to allow for (continuous) wireless communication (of real-time data). A twenty-ninth embodiment can include the dongle of the first to twenty-eighth embodiments, wherein the shape and size of the dongle may be configured to comfortably/snugly fit within the IR transceiver slot of the portable/wearable gas detector. A thirtieth embodiment can include the dongle of the first to twenty-ninth embodiments, wherein the dongle may further comprise a near-field communication (NFC) antenna to allow data transfer between the dongle and the handheld/portable device (e.g. the interface device in some embodiments may comprise an NFC antenna). A thirty-first embodiment can include the dongle of the first to thirtieth embodiments, further comprising a portable/wearable gas detector with an IR transceiver, wherein the dongle may be attached to the gas detector to allow communication/interfacing between the IR transceiver of the dongle and the IR transceiver of the gas detector. A thirty-second embodiment can include the dongle of the first to thirty-first embodiments, wherein the dongle may be configured so as to not fully cover the IR transceiver of the gas detector (e.g. gas detector operable to transmit IR signals to the dongle and/or to another device (when the dongle is attached)).

Exemplary embodiments might also relate to methods for using a dongle (e.g. similar to those described above, which may be considered optionally incorporated herein with respect to the discussion of the methods) to retrofit a (legacy) portable/wearable gas detector to allow wireless communication. Such method embodiments, for example, might include, but are not limited to, the following:

In a thirty-third embodiment, a method for using a dongle to retrofit a (legacy) portable/wearable gas detector (e.g. without (wireless) communication capabilities) to allow (continuous) wireless communication, the method may comprise: (attaching the dongle to the portable/wearable gas detector, wherein an IR transceiver of the dongle interfaces with (e.g. faces towards) an IR transceiver of the portable/wearable gas detector); (transmitting, by the portable/wearable gas detector, an IR transmission/signal to the IR transceiver of the dongle); receiving, by the IR transceiver of the dongle, an IR transmission/signal from the IR transceiver of the portable/wearable gas detector; (transmitting, by the IR transceiver of the dongle, the IR transmission/signal to the processor of the dongle); translating, by the processor of the dongle, the IR transmission signal to a wireless signal; (transmitting, by the processor of the dongle, the wireless signal to a wireless interface device); and transmitting the wireless signal via the wireless interface device. A thirty-fourth embodiment can include the method of the thirty-third embodiment, further comprising receiving, by the wireless interface device, an input (wireless) signal (e.g. from a handheld/portable device and/or a central station); (transmitting, by the wireless interface device, the input (wireless) signal to the processor); translating/converting, by the processor, the (wireless) input signal to an IR output signal; (transmitting the IR output signal from the processor to the IR transceiver of the dongle); and transmitting, by the IR transceiver of the dongle, the IR output signal to the IR transceiver of the gas detector (to which the dongle is attached). A thirty-fifth embodiment can include the method of the thirty-third to thirty-fourth embodiments, wherein the (wireless) input signal may relate to aggregated (gas) data from a plurality of gas detectors. A thirty-sixth embodiment can include the method of the thirty-third to thirty-fifth embodiments, wherein transmitting the wireless signal via the interface device may further comprise transmitting the wireless signal to a central station. A thirty-seventh embodiment can include the method of the thirty-third to thirty-sixth embodiments, wherein transmitting the wireless signal via the interface device may further comprise transmitting the wireless signal to a portable/handheld device (and thereby to a central station). A thirty-eighth embodiment can include the method of the thirty-third to thirty-seventh embodiments, typically further comprising: receiving, by the portable/handheld device, the wireless signal (via the wireless interface device); and transmitting, by the portable/handheld device, the wireless signal to a central station. A thirty-ninth embodiment can include the method of the thirty-third to thirty-eighth embodiments, wherein (the central station may be configured to receive wireless signals from a plurality of dongles and/or gas detectors with wireless capabilities) the central station may compile, process, and store various wireless signals received from various/multiple (e.g. a plurality of) dongles. A fortieth embodiment can include the method of the thirty-third to thirty-ninth embodiments, wherein the central station may compile, process, and store various wireless signals received from various/multiple (e.g. a plurality of) portable/handheld devices in communication with a plurality of dongles. A forty-first embodiment can include the method of the thirty-third to fortieth embodiments, wherein the user may reconfigure the gas detector device (so as to interact with the dongle via IR transmission) by performing a firmware upgrade. A forty-second embodiment can include the method of the thirty-third to forty-first embodiments, wherein the firmware upgrade may be performed wirelessly via the processor of the dongle (wirelessly receiving the firmware upgrade signal from a portable/handheld device and/or central station and) communicating with the processor of the gas detector. A forty-third embodiment can include the method of the thirty-third to forty-second embodiments, wherein the firmware upgrade may be performed via a wired connection to the gas detector. A forty-fourth embodiment can include the method of the thirty-third to forty-third embodiments, wherein attaching the dongle to the portable/wearable gas detector may comprise clipping the dongle onto the portable/wearable gas detector. A forty-fifth embodiment can include the method of the thirty-third to forty-fourth embodiments, wherein attaching the dongle to the portable/wearable gas detector may comprise inserting the dongle into a detachable boot on the portable/wearable gas detector. A forty-sixth embodiment can include the method of the thirty-third to forty-fifth embodiments, wherein attaching the dongle to the portable/wearable gas detector may comprise snapping the dongle into a slot on the portable/wearable gas detector. A forty-seventh embodiment can include the method of the thirty-third to forty-sixth embodiments, wherein the gas detector device may be configured to continuously communicate with a central station via the dongle to allow for real-time (e.g. during a work shift, typically a plurality of times per shift) processing of IR signals/transmission collected/gathered/detected by the portable/wearable gas detector. A forty-eighth embodiment can include the method of the thirty-third to forty-seventh embodiments, wherein the dongle may comprise a means to track a user's location, the method further comprising transmitting (via the wireless interface device) the user's location (to a portable/handheld device and/or a central station). A forty-ninth embodiment can include the method of the thirty-third to forty-eighth embodiments, wherein the dongle may comprise a means to track a user's location, the method further comprising linking (gas) real-time data with location. A fiftieth embodiment can include the method of the thirty-third to forty-ninth embodiments, wherein the portable/handheld device may be configured to track the user's location via global positioning systems (GPS) and send a wireless location signal to the central station. A fifty-first embodiment can include the method of the thirty-third to fiftieth embodiments, wherein the portable/handheld device may be configured to track the user's location via global positioning systems (GPS) corresponding to the wireless signals received via the dongle. A fifty-second embodiment can include the method of the thirty-third to fifty-first embodiments, wherein the received (gas) (real-time) data (from the gas detector) may correspond with (e.g. is linked to) location data. A fifty-third embodiment can include the method of the thirty-third to fifty-second embodiments, wherein the means to track the user's location may comprise using global positioning systems (GPS). A fifty-fourth embodiment can include the method of the thirty-third to fifty-third embodiments, wherein the means to track the user's location may comprise using Wi-Fi positioning system (WPS).

Exemplary embodiments might also relate to systems for using a dongle (e.g. similar to those described above, which may be considered optionally incorporated herein with respect to the discussion of the system) to retrofit a (legacy) portable/wearable gas detector to allow wireless communication. Such system embodiments, for example, might include, but are not limited to, the following:

In a fifty-fifth embodiment, a gas detector system may comprise: a dongle, wherein the dongle comprises: a housing, an infrared (IR) transceiver, a processor, a power source; and an interface device, wherein: the IR transceiver of the dongle may be configured to interact with an IR transceiver of a portable/wearable gas detector; the processor may be configured to translate between the IR transceiver of the dongle and the interface device; the housing may comprise a (removable) means of attachment to the portable/wearable gas detector; and the dongle may be configured to communicate with the portable/wearable gas detector and send and receive real-time data via a central station using wireless connection; and a gas detector, wherein the gas detector may be operable to detect gas levels in the environment, wherein the gas detector may comprise: an IR transceiver configured/operable to transmit detected gas levels; a processor comprising memory; and a power source. A fifty-sixth embodiment can include the gas detector system of the fifty-fifth embodiment, further comprising a portable/handheld device. A fifty-seventh embodiment can include the gas detector system of the fifty-fifth to fifty-sixth embodiments, further comprising a central station, wherein the central station may be configured to receive wireless (gas) data from a plurality of gas detectors and/or dongles (and, for example, aggregate data (with corresponding location information) to form a gas concentration/exposure map). A fifty-eighth embodiment can include the gas detector system of the fifty-fifth to fifty-seventh embodiments, further comprising a wireless infrastructure. A fifty-ninth embodiment can include the gas detector system of the fifty-fifth to fifty-eighth embodiments, further comprising a plurality of gas detectors (e.g. in wireless communication with a central station). A sixtieth embodiment can include the gas detector system of the fifty-fifth to fifty-ninth embodiments, further comprising a plurality of such dongles, wherein each such dongle may be attached to and interacts with a corresponding one of the plurality of gas detectors (without wireless capabilities). A sixty-first embodiment can include the gas detector system of the fifty-fifth to sixtieth embodiments, wherein the dongle may be configured to interact with a portable/handheld device. A sixty-second embodiment can include the gas detector system of the fifty-fifth to sixty-first embodiments, wherein the dongle may be configured to interact with a central station. A sixty-third embodiment can include the gas detector system of the fifty-fifth to sixty-second embodiments, wherein the housing encloses the IR transceiver of the dongle, the processor, the power source, and the wireless interface device. A sixty-fourth embodiment can include the gas detector system of the fifty-fifth to sixty-third embodiments, wherein the wireless interface device comprises one of the following: Wi-Fi, Li-Fi, LTE, Bluetooth (BLE), and combinations thereof. A sixty-fifth embodiment can include the gas detector system of the fifty-fifth to sixty-fourth embodiments, wherein the wireless interface device comprises an external port/plug configured to interact (e.g. via a wire (such as USB)) with an external wireless device. A sixty-sixth embodiment can include the gas detector system of the fifty-fifth to sixty-fifth embodiments, wherein the processor is configured to convert the received IR signal from the gas detector to an output signal operable/configured for transmission by the wireless interface device and transmit to the wireless interface device for transmission. A sixty-seventh embodiment can include the gas detector system of the fifty-fifth to sixty-sixth embodiments, wherein the processor is configured to convert an input signal from the wireless interface device to an IR signal for the IR transceiver and transmit the IR signal to the IR transceiver for transmission. A sixty-eighth embodiment can include the gas detector system of the fifty-fifth to sixty-seventh embodiments, wherein the IR transceiver of the dongle is oriented outward from the housing (e.g. towards the IR transceiver of the portable/wearable gas detector). A sixty-ninth embodiment can include the gas detector system of the fifty-fifth to sixty-eighth embodiments, wherein the power source is configured to interact (e.g. supply power) with the IR transceiver of the dongle, the wireless interface device, and the processor. A seventieth embodiment can include the gas detector system of the fifty-fifth to sixty-ninth embodiments, wherein the power source (of the dongle) is separate from the power source within the portable/wearable gas detector. A seventy-first embodiment can include the gas detector system of the fifty-fifth to seventieth embodiments, wherein the dongle is separate and self-contained (e.g. not wired or otherwise directly electrically connected to the portable/wearable gas detector, such that the only interaction between the dongle and the gas detector is via IR transmission, for example between the IR transceiver of the dongle and the IR transceiver of the gas detector). A seventy-second embodiment can include the gas detector system of the fifty-fifth to seventy-first embodiments, wherein the dongle continuously communicates real-time (gas) data to the central station. A seventy-third embodiment can include the gas detector system of the fifty-fifth to seventy-second embodiments, wherein continuous communication comprises regular, periodic communication (for example, plurality of times during a work shift, for example, every 10 minutes, 5 minutes, 2 minutes, 1 minute, 30 seconds, 10 seconds, etc.). A seventy-fourth embodiment can include the gas detector system of the fifty-fifth to seventy-third embodiments, wherein continuous communication comprises open/constant communication/contact. A seventy-fifth embodiment can include the gas detector system of the fifty-fifth to seventy-fourth embodiments, wherein continuous communication comprises contact/communication whenever (any time) there is information to update (e.g. a change in (gas) data and/or a change in received data from the central station). A seventy-sixth embodiment can include the gas detector system of the fifty-fifth to seventy-fifth embodiments, wherein the central station may be a handheld/portable device such as a (smart) phone (e.g. handheld portable device), a central (remote/offsite) computer (for distributed computing), a cloud computing system (to enable cloud computing). A seventy-seventh embodiment can include the gas detector system of the fifty-fifth to seventy-sixth embodiments, wherein the dongle is configured to interact with a user's handheld/portable device (such as a smart phone or laptop) via a wireless signal (Bluetooth, WiFi, LTE, etc). A seventy-eighth embodiment can include the gas detector system of the fifty-fifth to seventy-seventh embodiments, wherein the handheld/portable device is configured/operable to interact (e.g. transmit and/or receive signal) with the central computer, a distributed computing system, a cloud computing system, and/or a wireless system. A seventy-ninth embodiment can include the gas detector system of the fifty-fifth to seventy-eighth embodiments, wherein the dongle further comprises a means to track the user's location. An eightieth embodiment can include the gas detector system of the fifty-fifth to seventy-ninth embodiments, wherein the means to track the user's location comprises using global positioning systems (GPS). An eighty-first embodiment can include the gas detector system of the fifty-fifth to eightieth embodiments, wherein the means to track the user's location comprises using Wi-Fi positioning system (WPS). An eighty-second embodiment can include the gas detector system of the fifty-fifth to eighty-first embodiments, wherein the dongle's means of attachment comprises one or more elements for clipping/ snapping the dongle onto the portable/wearable gas detector. An eighty-third embodiment can include the gas detector system of the fifty-fifth to eighty-second embodiments, wherein the dongle's means of attachment comprises one or more elements for inserting the dongle into a detachable boot on the portable/wearable gas detector. An eighty-fourth embodiment can include the gas detector system of the fifty-fifth to eighty-third embodiments, wherein the dongle's means of attachment comprises snapping the dongle into a slot on the portable/wearable gas detector, and wherein in such snapped-in configurations, the IR transceiver of the dongle interfaces with (e.g. faces towards) the IR transceiver of the portable/wearable gas detector when the dongle is attached to the gas detector (e.g. wherein the means of attachment is configured to position the IR transceiver of the dongle so as to interact with (e.g. face towards) the IR transceiver of the gas detector (so they will be operable to communicate via IR signals)). An eighty-fifth embodiment can include the gas detector system of the fifty-fifth to eighty-fourth embodiments, wherein the dongle is configured to be attached to the portable/wearable gas detector to retrofit the (legacy/older model without wireless communication capabilities) portable/wearable gas detector to allow for wireless communication (of real-time data). An eighty-sixth embodiment can include the gas detector system of the fifty-fifth to eighty-fifth embodiments, wherein the shape and size of the dongle is configured to comfortably/snugly fit within the IR transceiver slot of the portable/wearable gas detector. An eighty-seventh embodiment can include the gas detector system of the fifty-fifth to eighty-sixth embodiments, wherein the dongle may further comprise a near-field communication (NFC) antenna to allow data transfer between the dongle and the handheld device. An eighty-eighth embodiment can include the gas detector system of the fifty-fifth to eighty-seventh embodiments, further comprising a portable/wearable gas detector with an IR transceiver, wherein the dongle is attached to the gas detector to allow communication/interfacing between the IR transceiver of the dongle and the IR transceiver of the gas detector. An eighty-ninth embodiment can include the gas detector system of the fifty-fifth to eighty-eighth embodiments, wherein the dongle is configured so as to fully cover the IR transceiver of the gas detector (e.g. gas detector operable to transmit IR signals to the dongle and/or to another device (when the dongle is attached)).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dongle comprising:
    a housing;
    an infrared (IR) transceiver;
    a processor;
    a power source; and
    a wireless interface device;
    wherein:
        the IR transceiver of the dongle is configured to interact with an IR transceiver of a portable gas detector;

the processor is configured to translate between the IR transceiver of the dongle and the wireless interface device; and the housing comprises a means of attachment to the portable gas detector, wherein the means of attachment comprises one or more elements for snap fitting the dongle into the portable gas detector.

2. The dongle of claim 1, wherein the dongle is configured to send real-time data between the portable gas detector and a central station using wireless connection, and wherein the dongle is configured to attach to the portable gas detector to allow interfacing between the IR transceiver of the dongle and the IR transceiver of the portable gas detector.

3. The dongle of claim 1, wherein the wireless interface device comprises one of the following: Wi-Fi, Li-Fi, LTE, Bluetooth (BLE), and combinations thereof.

4. The dongle of claim 1, wherein the wireless interface device comprises an external port configured to interact with an external wireless device.

5. The dongle of claim 1, wherein the processor is configured to convert an IR signal received from the portable gas detector to an output signal configured for transmission by the wireless interface device and transmit the converted IR signal to the wireless interface device for transmission, and wherein the processor is configured to convert an input signal received from the wireless interface device to another IR signal for the IR transceiver and transmit the other IR signal to the IR transceiver for transmission.

6. The dongle of claim 1, wherein the dongle is separate and self-contained; wherein the dongle continuously communicates real-time data to a central station; wherein continuous communication comprises regular, periodic communication; and wherein continuous communication comprises communication whenever there is information to update.

7. The dongle of claim 6, wherein the dongle is configured to interact with a user's portable device via a wireless signal, and wherein the user's portable device is operable to interact with the central station, a distributed computing system, a cloud computing system, or a wireless system.

8. The dongle of claim 7, wherein the dongle communicates with the user's portable device using a first wireless communication mode, while the user's portable device is also operable for wireless communication via a second wireless communication mode.

9. The dongle of claim 7, wherein a means to track a user's location is provided by the user's portable device, which links gas data with the user's location for transmission to the central station.

10. The dongle of claim 1, wherein the dongle further comprises a means to track a user's location, wherein the means to track the user's location comprises using global positioning systems (GPS) or a Wi-Fi positioning system (WPS), and wherein the processor links the user's location with gas data for transmission.

11. The dongle of claim 1, wherein the means of attachment of the dongle comprises snapping the dongle into a slot on the portable gas detector, and wherein in such snapped-in configurations, the IR transceiver of the dongle interfaces with the IR transceiver of the portable gas detector when the dongle is attached to the portable gas detector.

12. The dongle of claim 1, wherein the dongle may further comprise a near-field communication (NFC) antenna to allow data transfer between the dongle and the portable gas detector.

13. The dongle of claim 1, wherein the dongle is configured so as to not fully cover the IR transceiver of the portable gas detector.

14. A method for using a dongle to retrofit a portable gas detector to allow wireless communication, the method comprising:

attaching the dongle to the portable gas detector, wherein the attaching the dongle to the portable gas detector comprises snap fitting the dongle into the portable gas detector;

receiving, by an IR transceiver of the dongle, an IR transmission signal from an IR transceiver of the portable gas detector;

translating, by a processor of the dongle, the IR transmission signal to a wireless signal; and transmitting the wireless signal via a wireless interface device.

15. The method of claim 14, further comprising:

receiving, by the wireless interface device, an input signal;

translating, by the processor, the input signal to an IR output signal; and transmitting, by the IR transceiver of the dongle, the IR output signal to the IR transceiver of the portable gas detector.

16. The method of claim 15, wherein the input signal relates to aggregated data from a plurality of gas detectors.

17. The method of claim 14, wherein a central station compiles, processes, and stores various wireless signals received from various dongles.

18. The method of claim 14, wherein transmitting the wireless signal via the wireless interface device further comprises transmitting the wireless signal to a central station.

19. The method of claim 14, wherein transmitting the wireless signal via the wireless interface device further comprises transmitting the wireless signal to a handheld device.

20. The method of claim 19, further comprising:

receiving, by the handheld device, the wireless signal; and transmitting, by the handheld device, the wireless signal to a central station.

* * * * *